(12) United States Patent
Betts

(10) Patent No.: US 9,334,643 B2
(45) Date of Patent: May 10, 2016

(54) THREE DIMENSIONAL UPWARDLY CONVEX FRAME AND A METHOD OF CONSTRUCTING SAME

(75) Inventor: John Marsden Betts, Waitara (AU)

(73) Assignee: BETCONFRAME INTERNATIONAL PTY LTD, Waitara, NSW (AU)

( * ) Notice: Subject to any disclaimer, the term of this patent is extended or adjusted under 35 U.S.C. 154(b) by 0 days.

(21) Appl. No.: 14/127,374

(22) PCT Filed: Jun. 5, 2012

(86) PCT No.: PCT/AU2012/000640
§ 371 (c)(1),
(2), (4) Date: Dec. 18, 2013

(87) PCT Pub. No.: WO2013/003882
PCT Pub. Date: Jan. 10, 2013

(65) Prior Publication Data
US 2014/0130424 A1  May 15, 2014

(30) Foreign Application Priority Data

Jul. 4, 2011  (AU) ................................ 2011902659

(51) Int. Cl.
*E04H 15/38* (2006.01)
*E04H 15/48* (2006.01)
(Continued)

(52) U.S. Cl.
CPC ... *E04B 1/32* (2013.01); *A01K 1/00* (2013.01); *A01K 61/006* (2013.01); *A63G 31/00* (2013.01); *A63H 33/08* (2013.01); *A63H 33/12* (2013.01); *E04B 1/342* (2013.01); *E04B 7/105* (2013.01); *E04B 2001/3241* (2013.01); *E04B 2001/3252* (2013.01); *E04H 3/02* (2013.01); *E04H 3/14* (2013.01); *E04H 6/10* (2013.01); *E04H 6/36* (2013.01); *E04H 6/44* (2013.01); *E04H 15/48* (2013.01)

(58) Field of Classification Search
CPC ....... E04H 15/322; E04H 15/36; E04H 15/44; E04H 15/46; E04H 15/48; E04H 15/50; E04H 15/52; E04B 1/32; E04B 1/3205; E04B 1/3441; E04B 1/3445; E04B 2001/3241; E04C 3/005; E04C 2/405
USPC ............. 52/109, 108, 71, 633, 639, 641, 645; 135/121, 124, 128, 131, 143, 145
See application file for complete search history.

(56) References Cited

U.S. PATENT DOCUMENTS

| 1,766,901 A | * | 6/1930 | Gustavson | ................. 248/277.1 |
| 3,335,815 A | * | 8/1967 | Oakes | ........................... 182/157 |

(Continued)

FOREIGN PATENT DOCUMENTS

| GB | 156411 A | 1/1921 |
| WO | 8908172 A1 | 9/1989 |

*Primary Examiner* — Joshua J Michener
*Assistant Examiner* — Kyle Walraed-Sullivan

(57) ABSTRACT

A 3-dimensional, upwardly convex frame (40) constructed from a plurality of substantially identical longitudinally extending frame members (42). The frame (40) includes: the frame members (42) connected at approximately their ends to above approximately the middle of adjacent frame members (42) and the frame members (42) connected at approximately their middle to below approximately the ends of adjacent frame members (42) in a generally outwardly extending sequence. The outwardly facing ends of the outermost frame members (42) are un-connected.

21 Claims, 20 Drawing Sheets

(51) Int. Cl.

| | | |
|---|---|---|
| *E04B 1/344* | (2006.01) | |
| *E04B 1/32* | (2006.01) | |
| *A01K 1/00* | (2006.01) | |
| *A01K 61/00* | (2006.01) | |
| *A63H 33/12* | (2006.01) | |
| *A63G 31/00* | (2006.01) | |
| *E04B 7/10* | (2006.01) | |
| *A63H 33/08* | (2006.01) | |
| *E04B 1/342* | (2006.01) | |
| *E04H 3/14* | (2006.01) | |
| *E04H 6/10* | (2006.01) | |
| *E04H 6/44* | (2006.01) | |
| *E04H 3/02* | (2006.01) | |
| *E04H 6/36* | (2006.01) | |

(56) References Cited

U.S. PATENT DOCUMENTS

| | | | | |
|---|---|---|---|---|
| 3,710,806 | A * | 1/1973 | Kelly | E04B 1/3441 135/145 |
| 3,729,877 | A * | 5/1973 | Hall | 52/109 |
| 3,888,056 | A * | 6/1975 | Kelly | E04B 1/32 135/145 |
| 4,156,433 | A * | 5/1979 | Beaulieu | 135/145 |
| 4,227,358 | A * | 10/1980 | Gat | 52/655.1 |
| 4,325,207 | A * | 4/1982 | Russell et al. | 52/641 |
| 4,373,305 | A * | 2/1983 | Russell | 52/86 |
| 4,589,236 | A * | 5/1986 | McAllister | E04B 1/3211 403/174 |
| 4,620,747 | A * | 11/1986 | Lemmon | 297/440.1 |
| 4,628,560 | A * | 12/1986 | Clevett et al. | 14/2.4 |
| 4,703,594 | A * | 11/1987 | Reber | E04B 1/3211 403/172 |
| 4,998,552 | A * | 3/1991 | Niksic | E04B 1/3441 135/136 |
| 5,038,532 | A * | 8/1991 | Shahinpoor | 52/109 |
| 5,444,946 | A * | 8/1995 | Zeigler | 52/86 |
| 6,173,726 | B1 * | 1/2001 | Talmadge | 135/144 |
| 6,206,020 | B1 * | 3/2001 | Lynch | 135/128 |
| 6,276,095 | B1 * | 8/2001 | Tripsianes | E04B 1/3211 135/125 |
| 6,708,707 | B2 * | 3/2004 | Dotterweich | E04H 15/50 135/131 |
| 6,929,017 | B2 * | 8/2005 | Byun | E04H 15/50 135/131 |
| 7,255,314 | B2 * | 8/2007 | Hanson et al. | 248/277.1 |
| 7,533,498 | B2 * | 5/2009 | Zeigler | 52/79.5 |
| 7,712,261 | B2 * | 5/2010 | Zeigler | 52/79.5 |
| 7,753,064 | B2 * | 7/2010 | Sy-Facunda | 135/131 |
| 2004/0173252 | A1 * | 9/2004 | Bouchard | 135/131 |
| 2005/0204680 | A1 * | 9/2005 | Zeigler | 52/646 |
| 2006/0101731 | A1 * | 5/2006 | Hanson et al. | 52/109 |
| 2008/0010912 | A1 * | 1/2008 | Hanson et al. | 52/109 |
| 2009/0071520 | A1 * | 3/2009 | Sy-Facunda | 135/93 |
| 2009/0314323 | A1 * | 12/2009 | Park | E04H 15/44 135/145 |
| 2010/0269877 | A1 * | 10/2010 | Sy-Facunda | 135/145 |
| 2010/0317498 | A1 * | 12/2010 | Mallookis et al. | 482/148 |
| 2011/0252717 | A1 * | 10/2011 | Graf Fernandez | 52/71 |
| 2012/0017961 | A1 * | 1/2012 | Hughes | 135/131 |
| 2013/0118110 | A1 * | 5/2013 | Davies | 52/641 |
| 2013/0139449 | A1 * | 6/2013 | Ho | 52/71 |
| 2013/0145717 | A1 * | 6/2013 | Merrifield | 52/646 |
| 2013/0263548 | A1 * | 10/2013 | Merrifield | 52/646 |
| 2014/0158176 | A1 * | 6/2014 | Lovley, II | 135/145 |

* cited by examiner

THREE DIMENSIONAL UPWARDLY CONVEX FRAME AND A METHOD OF CONSTRUCTING SAME

FIELD OF THE INVENTION

The present invention relates to a three dimensional upwardly convex frame and a method of constructing a three dimensional upwardly convex frame.

The present invention has been primarily developed for structural applications such as: hangars; workshops; commercial buildings; emergency accomodation; military encampments; sports stadiums; camping accomodation; fairground and market day covers; car parks; light aircraft covers; mining camps; evacuation sites; playgrounds; small marine vessel protection; floating dome pontoons; emergency crop and fodder storage; emergency livestock protection; minerals and horticulture protection; underwater installations for fish farming; or artificial reef structure, and will be described hereinafter with reference to these applications, particularly for the roofing of these applications. However, it will be appreciated that the invention is not limited to these particular uses and is able to be inverted for non-structural applications such as: antenna dishes; solar collectors; or mirror supports.

In addition, the invention is also suitable for low-rise structural applications such as: multiple interconnected domes (forming a chain of smaller domes suitable for pathways, passages, rail stations or wharves); ground plans as elongated elipses; or underground bunker roof supports.

The invention is also suitable for use as a toy for children.

BACKGROUND OF THE INVENTION

The existing techniques for the construction of structures and roofing of the types mentioned above have many disadvantages, including that they can generally only be undertaken by skilled personnel/specialist trades with access to expensive and complex equipment, such as cranes etc., for elevating various components during the construction process. This makes construction of such structures relatively expensive and difficult in remote and/or financially disadvantaged areas. In addition, known construction techniques involve the use of numerous specialised components, with the omission of a particular component hampering construction. Further, known construction techniques often require workers to work in elevated positions, which requires further specialised equipment and also represents a safety hazard. Other disadvantages of known construction techniques include the need for: extensive site preparation; planning and logistics; long lead times for design and manufacturing; inspection and supervision of workers; and on site engineering and architectural services.

OBJECT OF THE INVENTION

It is the object of the present invention to substantially overcome or at least ameliorate one or more of the above disadvantages.

SUMMARY OF THE INVENTION

Accordingly, in a first aspect, the present invention provides a 3-dimensional, upwardly convex frame constructed from a plurality of substantially identical longitudinally extending frame members, the frame including: the frame members connected at approximately their ends to above approximately the middle of adjacent frame members and the frame members connected at approximately their middle to below approximately the ends of adjacent frame members in a generally outwardly extending sequence, wherein the outwardly facing ends of the outermost frame members are unconnected.

In a second aspect, the present invention provides a 3-dimensional, upwardly convex frame constructed from a plurality of substantially identical longitudinally extending frame members, the frame including: first, second and third and fourth frame members, the first frame member connected at approximately one end to above approximately the middle of the second frame member, the second frame member connected at approximately one end to above approximately the middle of the third frame member, the third frame member connected approximately at one end to above approximately the middle of the fourth frame member; wherein the frame includes further frame members connected in a like manner until the frame of a predetermined size is constructed.

The frame preferably includes fifth, sixth, seventh and eighth frame members, the fifth frame member connected at approximately one end to above approximately the middle of the first frame member, the sixth frame member connected at approximately one end to above approximately the middle of the second frame member, the seventh frame member connected at approximately one end to above approximately the middle of the third frame member, the eighth frame member connected at approximately one end to above approximately the middle of the fourth frame member.

Preferably, the frame includes ninth and onwards further said frame members connected in said like manner until the frame of the predetermined size is constructed.

In one embodiment, the frame members are substantially sequentially connected at approximately their ends to above approximately the middle of adjacent frame members and at approximately their middle to below approximately the ends of adjacent frame members.

The frame members are preferably connected in a spiralling, generally outwardly extending sequence.

In one form, the frame members preferably include a pair of holes approximately adjacent their middle and a single hole approximately adjacent each end. In this form, the frame members are connected to each other by fasteners, for example pins, nails, bolts, passing through adjacent frame members.

In another form, the frame members preferably include a pair male engaging formations, such as a spigot, approximately adjacent their middle and a corresponding single female engaging formation, such a hole or recess, approximately adjacent each end.

In yet another form, the frame members preferably include a pair of female engaging formations, such a hole or recess, approximately adjacent their middle and a corresponding single female engaging formation, such as a spigot, approximately adjacent each end. In these forms, the frame members are connected to each other by one of the male engaging formations being received within one of the corresponding female engaging formations.

In another form, the frame members preferably include a recess approximately adjacent their middle and a recess approximately adjacent each end, the recesses being wider than the width of the frame members.

In a yet further form, the frame members are connected to each other by adhesives at the region of overlapping between adjacent frame members.

In another version, the frame members are connected by loosely abutting at approximately their ends to above approximately the middle of adjacent frame members.

In yet another version, the frame members connected by overlapping at approximately their ends to above approximately the middle of adjacent frame members.

In another embodiment, the frame members are initially connected at approximately their ends to level approximately the middle of adjacent frame members and at approximately their middle to level approximately the ends of adjacent frame members, until the frame of said predetermined size is constructed, and subsequently repositioned such that the frame members are connected at approximately their ends to above approximately the middle of adjacent frame members and at approximately their middle to below approximately the ends of adjacent frame members, thereby forming said 3-dimensional, upwardly convex shape in said frame.

The subsequently repositioning is preferably achieved with a plurality of drive devices, respectively positioned adjacent the middle and ends of said frame members. The drive devices are preferably manually, hydraulically, pneumatically or electrically powered. The drive devices are preferably lockable or latchable after said subsequent repositioning.

In a third aspect, the present invention provides a method of constructing a 3-dimensional, upwardly convex frame from a plurality of substantially identical longitudinally extending frame members, the method including the steps of:

connecting approximately the ends of the frame members to above approximately the middle of adjacent frame members and connecting approximately the middle of the frame members to below approximately the ends of adjacent frame members in a generally outwardly extending sequence until the frame of predetermined size is constructed; and leaving outwardly facing ends of outermost frame members un-connected.

In a fourth aspect, the present invention provides a method of constructing a 3-dimensional, upwardly convex frame from a plurality of substantially identical longitudinally extending frame members, the method including the steps of:

connecting approximately an end of a first frame member to above about approximately the middle of a second frame member;

connecting approximately an end of the second frame member to above approximately the middle of a third frame member;

connecting approximately an end of the third frame member to above approximately the middle of a fourth frame member;

connecting approximately an end of the fourth frame member to above approximately the middle of the first frame member; and repeating the connection sequence defined in steps a. to d. until with further frame members until the frame of a predetermined size is constructed.

The method preferably includes the steps of: connecting approximately an end of a fifth frame member to above approximately the middle of the first frame member; connecting approximately an end of a sixth frame member to above approximately the middle of the second frame member; connecting approximately an end of a seventh frame member to approximately about the middle of the third frame member; and connecting approximately an end of an eighth frame member to above approximately about the middle of the fourth frame member.

The method preferably includes repeating the connection sequence defined in steps f. to i. until with ninth and onwards further said frame members until the frame of said predetermined size is constructed.

In one embodiment, the method includes the repeat steps of:

sequentially connecting said frame members at approximately their ends to above approximately the middle of adjacent frame members and at approximately their middle to below approximately the ends of adjacent frame members.

The method preferably includes connecting the frame members in a spiralling, generally outwardly extending sequence.

In one form, the connecting of the frame members includes aligning a hole approximately adjacent the middle of a frame member with a hole approximately adjacent an end of an adjacent frame member. In this form, fasteners, for example pins, nails, bolts, are passed through adjacent frame members.

In another form, the connecting of the frame members includes inserting a male engaging formation, such as a spigot, approximately adjacent the middle of a frame member in a corresponding single female engaging formation, such as a hole or recess, approximately adjacent the end of an adjacent frame member.

In another form, the connecting of the frame members includes inserting a male engaging formation, such as a spigot, approximately adjacent the end of a frame member in a corresponding single female engaging formation, such as a hole or recess, approximately adjacent the middle of an adjacent frame member.

In another form, the connecting of the frame members includes inserting an end of a frame member into a recess approximately adjacent the middle of an adjacent frame member and inserting a middle of a frame member into a recess approximately adjacent the end of an adjacent frame member, the recesses being wider than the width of the frame members.

In a yet further form, the connecting of the frame members includes applying adhesives at the region of overlapping between adjacent frame members.

In another version, the connecting of the frame members includes loosely abutting at approximately their ends to above approximately the middle of adjacent frame members.

In yet another version, the connecting of the frame members includes overlapping at approximately their ends to above approximately the middle of adjacent frame members.

In another embodiment, the method includes the repeat steps of:

initially connecting said frame members at approximately their ends to level approximately the middle of adjacent frame members and at approximately their middle to level approximately the ends of adjacent frame members, until the frame of said predetermined size is constructed; and thereafter subsequently repositioning said frame members at approximately their ends to above approximately the middle of adjacent frame members and at approximately their middle to below approximately the ends of adjacent frame members, thereby forming said 3-dimensional, upwardly convex shape in said frame.

BRIEF DESCRIPTION OF THE DRAWINGS

Preferred embodiments of the present invention will now be described, by way of examples only, with reference to the accompanying drawings in which.

DETAILED DESCRIPTION OF THE PREFERRED EMBODIMENTS

Figure 1:
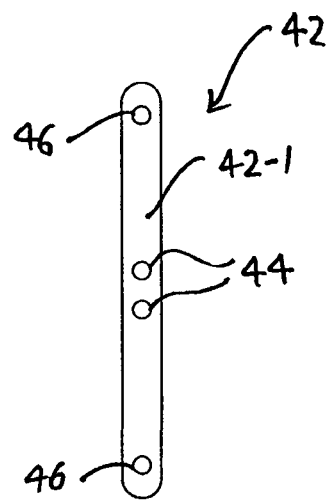
FIGS. 1 to 8 are sequential top views showing construction of a first embodiment of a three dimensional upwardly convex frame.

FIGS. 1 to 8 show sequentially the construction of a first embodiment of a three dimensional upwardly convex frame 40 (see FIG. 8) from a plurality of substantially identical longitudinally extending, relatively rigid, frame members 42. The frame members 42 have a pair of holes 44 approximately adjacent their middle and a single hole 46 approximately adjacent each end. The construction of the frame 40 begins with the positioning of a first frame member 42-1 on the ground (or other easily accessible supporting surface), as shown in FIG. 1.

Figure 2:
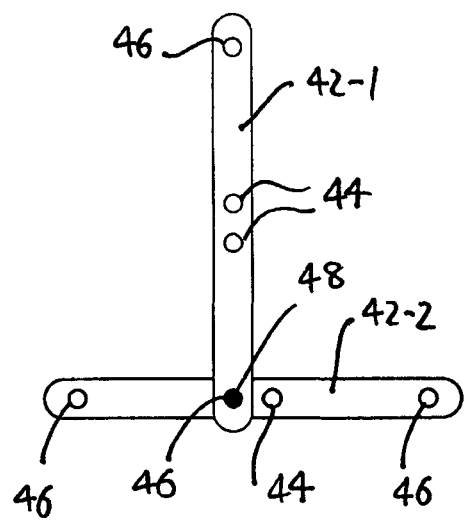

FIG. 2 shows the second construction step, being the positioning of a second frame member 42-2 with one of its middle holes 44 positioned below one of the end holes 46 of the first frame member 42-1. A relatively loose fitting pin 48 is then placed through the overlapping holes 44, 46 to fix the members 42-1 and 42-2 together, whilst permitting some relative movement therebetween. The frame member 42-2 is placed on the ground and the frame members 42-1 is elevated sufficiently to enable the overlapping arrangement. Depending on the size of the frame member 42, the elevation can be by manual lifting, by jacking (eg. hydraulic) or by a simple tool such as front end loader or back hoe. As frame members 42 are added to the frame 40 its total weight increases. Ignoring friction, the lifting force required to insert an additional frame member 42 is the total weight of the assembled frame members 42 divided by the number of frame members 42 touching the ground.

Figure 3:
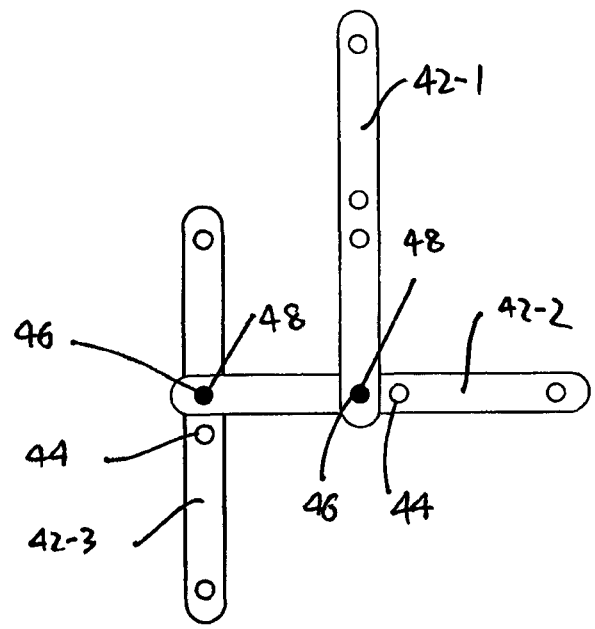

FIG. 3 shows the third construction step, being the positioning of a third frame member 42-3 with one of its middle holes 44 positioned below one of the end holes 46 of the second frame member 42-2. A relatively loose fitting pin is then placed through the overlapping holes 44, 46 to fix the members 42-2 and 42-3 together, whilst permitting some relative movement. The frame members 42-3 is placed on the ground and the frame members 42-2 is elevated slightly to enable the overlapping arrangement.

Figure 4:
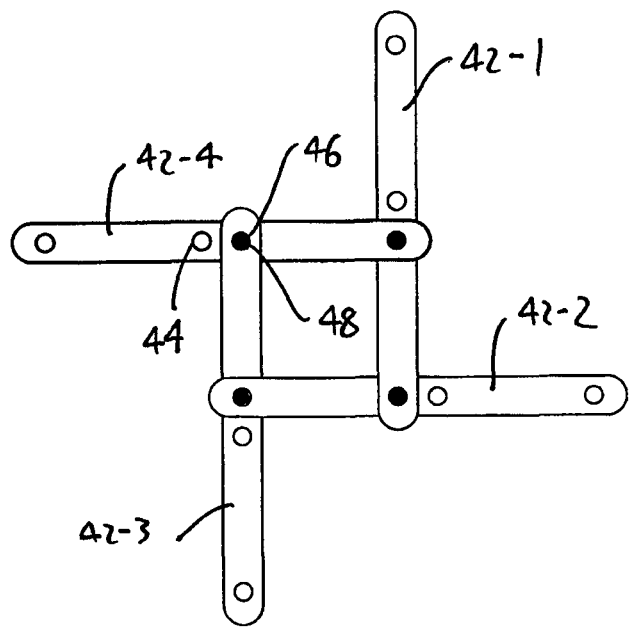

FIG. 4 shows the fourth construction step, being the positioning of a fourth frame member 42-4 with one of its middle holes 44 positioned below one of the end holes 46 of the third frame member 42-3. The other end hole 46 of the fourth frame member 42-4 is positioned above one of the middle holes of the 44 of the first frame member 42-1. The relative movement afforded by the loose fitting pins 48 facilitates the overlapping positioning of the frame members 42. The frame members 42-3 is placed on the ground and the frame members 42-2 elevated slightly to enable the overlapping arrangement.

The overlapping regions of the frame 40 are now elevated by twice the vertical thickness of the frame members 42. This begins to introduce an upwardly convex curvature into the frame 40 with the radius of the frame being determined by ratio of the length of the frame member 40 to the thickness of the frame member 40.

In the embodiment described with reference to FIGS. 1 to 8, this ratio is approximately 16.5:1. A smaller ratio produces a more curved dome shape and a larger ratio produces a less curved (ie. flatter) dome shape.

Figure 5:
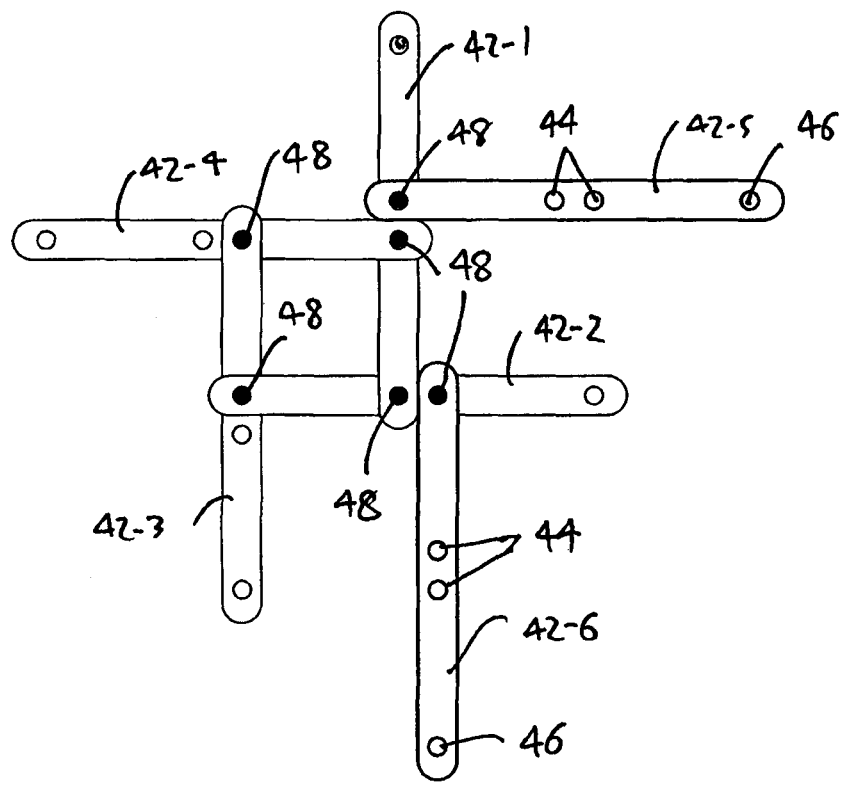

FIG. 5 shows the sixth and seventh construction steps, being the addition of the sixth and seventh frame members 42-6 and 42-7 respectively. Again, their end holes 46 are positioned above the middle holes 44 of adjacent beams and retained by the pins 48. Again, the newly added frame members 42 are placed on the ground and the existing frame members are each elevated slightly to enable the overlapping arrangement.

Figure 6:
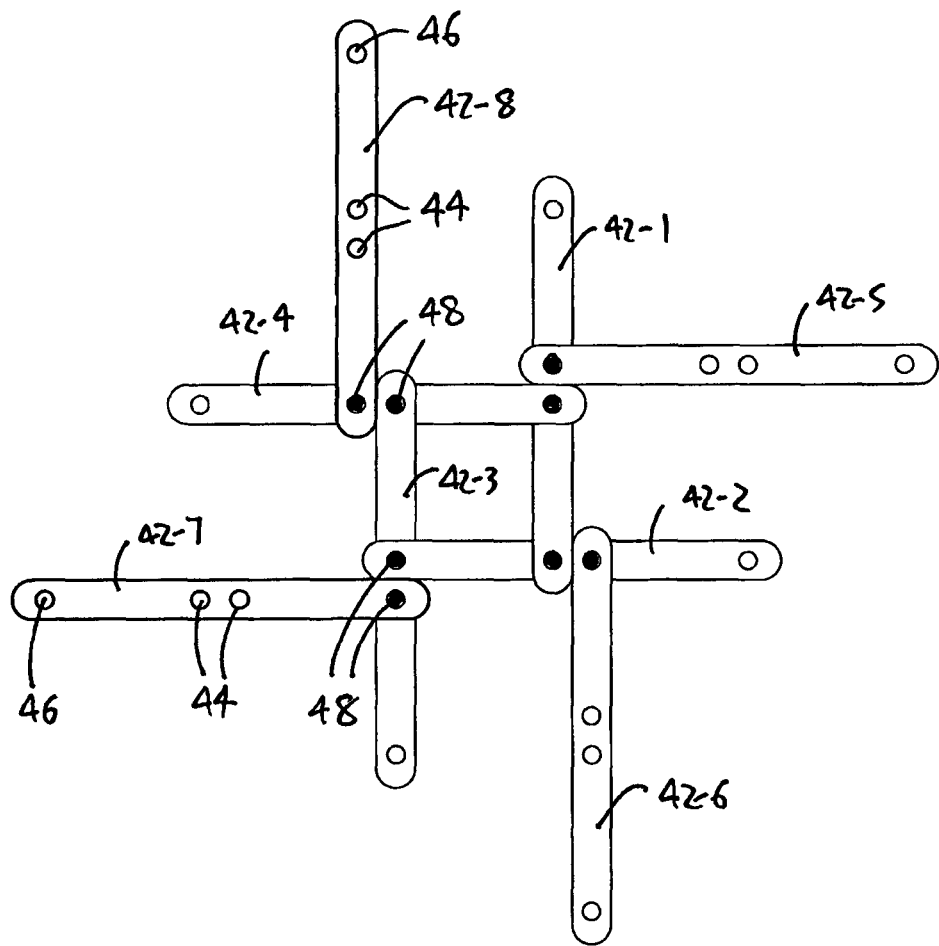

FIG. 6 similarly shows the addition of seventh and eight frame members 42-7 and 42-8 respectively.

Figure 7:
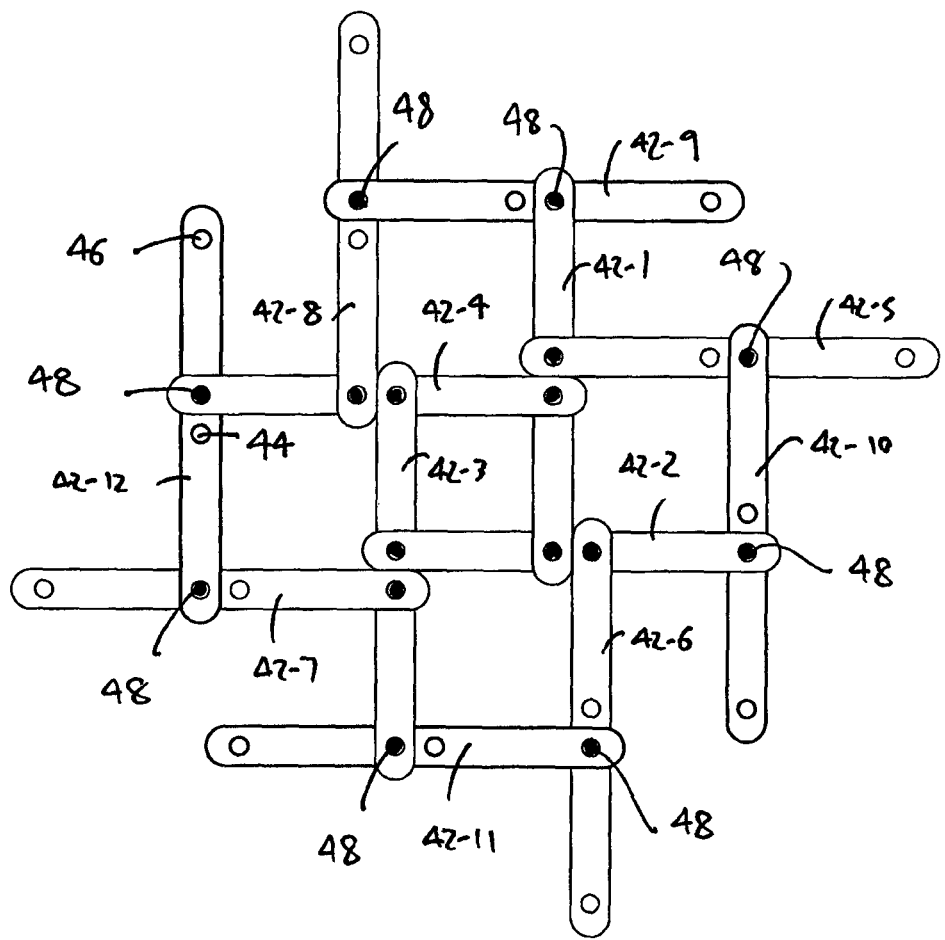

FIG. 7 similarly shows the addition of ninth to twelfth frame members 42-9 to 42-12 respectively.

Figure 8:
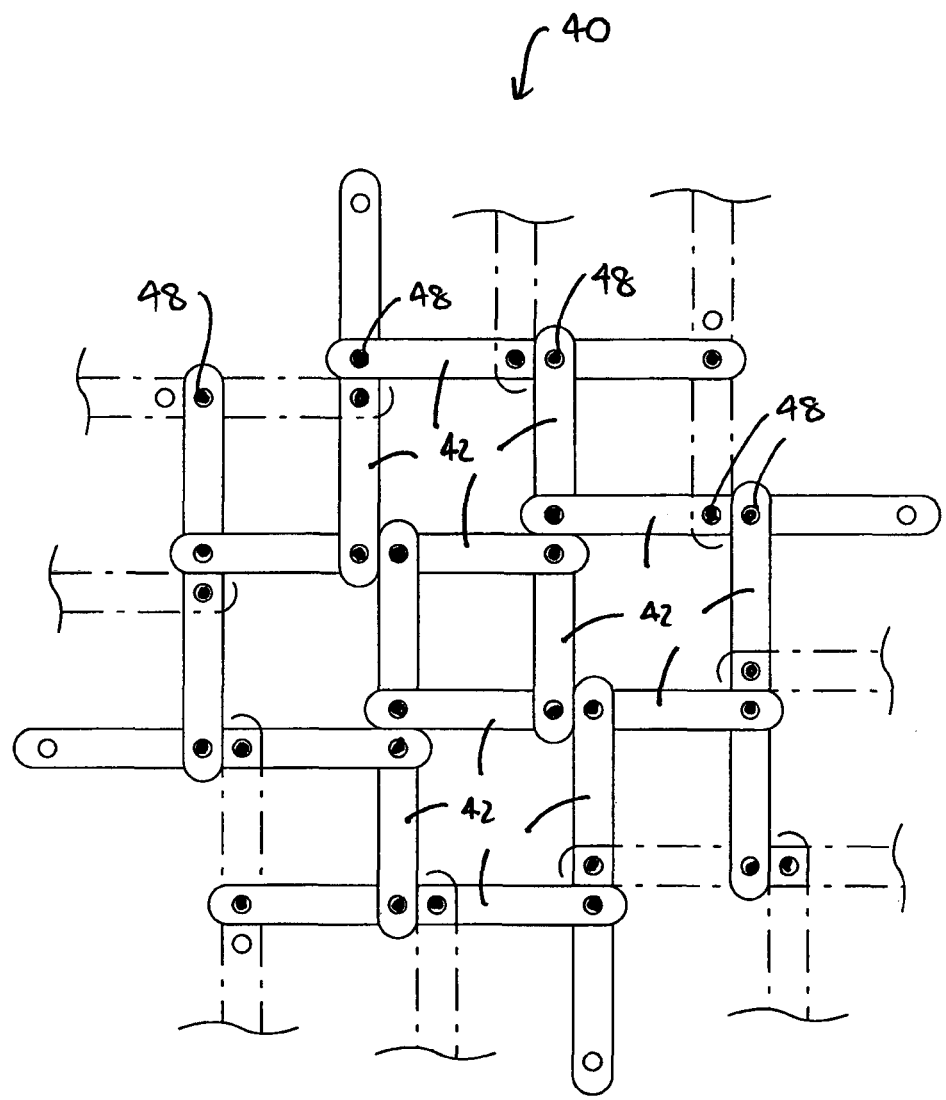

FIG. 8 demonstrates how further frame members 42 can be continually or sequentially added in a generally outwardly extending spiralling sequence until the frame 40 of the predetermined or required size is produced. The upwardly convex curvature or shape, brought about by the overlapping and self-supporting frame members 42, is best seen in perspective views such as FIGS. 15, 16, 25 and 26.

Disassembly is a reverse of the above steps, and again is conducted from the ground.

As mentioned above, the connection between adjacent frame members 42 at overlapping holes 44, 46 is initially performed by the pins 48 that are a relatively loose fit in the holes 44, 46 so that the frame members 42 may move relative to one another during the construction process and make the alignment of the holes 44, 46 easier. Such movement is not required when the frame ~O has been completed and the pins 48 can be replaced by more permanent connections such as bolts or other fasteners. Alternatively, the frame members 42 can be fixed to each other with adhesives. It should be noted that the pins 48 serve only to locate the frame members 48, they do not carry structural loads.

The frame 40 and its construction technique possess many advantages. Firstly, the frame 40 is erected entirely from ground level with each additional frame member 42 being positional at ground level and raising the frame members 42 that preceeded it. In other words, only one frame member needs to be elevated at a time. This is avoids the use of expensive, complicated and potentially dangerous equipment such as cranes. Secondly, as all of the frame members 42 are identical and all the fasteners are identical the need for expensive specialised parts and/or tools is also obviated. The need to work at height, and the associated safety risks, are also obviated. The simple and repetative construction process also does not require workers with specialised training or tools, and is thus particularly suited for remote areas or areas subjected to a natural disaster.

The frame can be constructed, and dismantled, very easily and quickly. This allows open spaces to be covered and protected in a prompt and economical way. The constructions process is also potentially wholely or partially automatable.

The identical frame members are also simple to manufacture, from a wide variety of materials, and suitable for supply in kit form. When disassembled, the frame members and pins/fasteners etc are compact, making transport convenient and relatively economic.

The frame can also be constructed without requiring extensive site preparation.

The frame can be used in structural applications such as: hangars; workshops; commercial buildings; emergency accomodation; military encampments; sports stadiums; camping accomodation; fairground and market day covers; car parks; light aircraft covers; mining camps; evacuation sites; playgrounds; small marine vessel protection; floating dome pontoons; emergency crop and fodder storage; emergency livestock protection; minerals and horticulture protection; underwater installations for fish farming; or artificial reef structure, particularly for the roofing of these applications. The frame can also be inverted for non-structural applications such as: antenna dishes; solar collectors; or mirror supports. The frame can also be used for low-rise structural applications such as: multiple interconnected domes (forming a chain of smaller domes suitable for pathways, passages, rail stations or wharves); ground plans as elongated elipses; or underground bunker roof supports.

Various types of coverings can also be easily added (temporarily or permanent) to the outside or the inside of the frame, such as: reflective; insulative; flexible; or rigid.

The frame can also be produced in a number of standard sizes, having pre-tested and pre-approved mechanical and structural properties, and supplied with installation instructions for each of the standard sizes.

Foundations can also be added to the frame before or after construction. For example, a basic levelling of the ground is generally sufficient.

Further frame embodiments will now be described, with like references numerals to those used above being used to indicate like features.

Figures 9, 10:
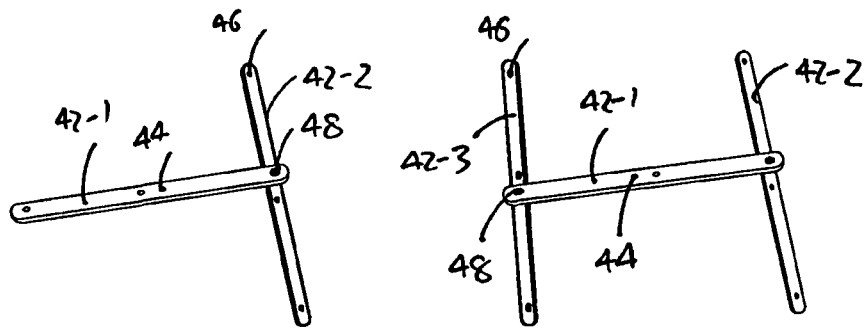
FIGS. 9 to 16 show sequential top views of construction of a second embodiment of a three dimensional upwardly convex frame.

FIGS. 9 to 18 show a second embodiment of a frame 50 (see FIG. 16) constructed from the frame members 42 using a different sequence of constructions steps. FIG. 9 shows the positioning on the ground of the first and second frame members 42-1 and 42-2 respectively.

FIG. 10 shows the positioning of the third frame member 42-3 with its middle hole 44 being positioned below the end hole 46 of the first frame member 42-1. This elevates the first frame member 42-1

Figures 11, 12:
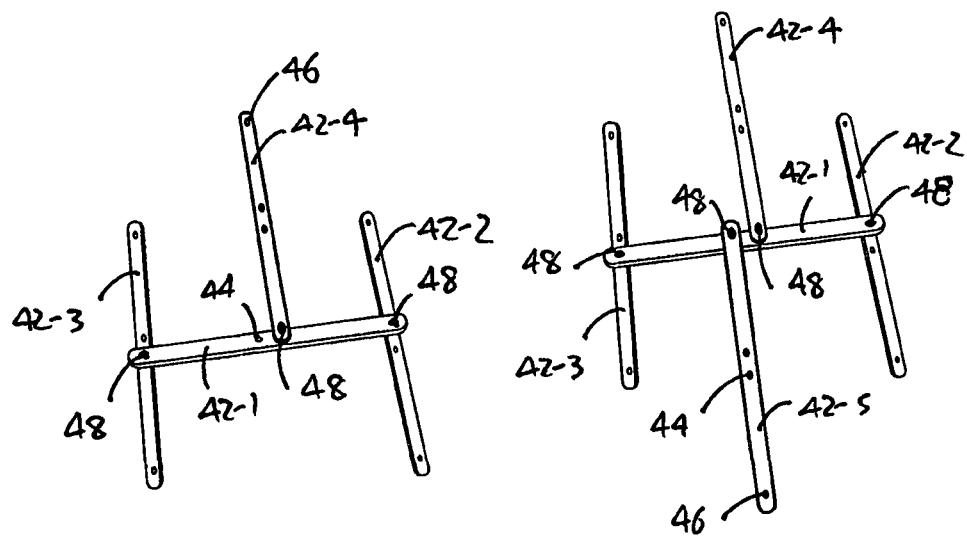

FIGS. 11 and 12 show the next two construction steps, being the addition of fourth and fifth frame members 42-4 and 44-5 respectively with their ends positioned above the middle of the first frame member 42-1.

Figure 13:
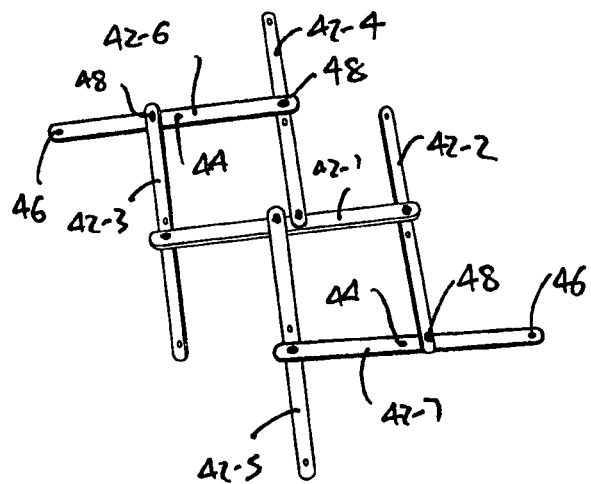

FIG. 13 shows the addition of sixth and seventh frame members 42-6 and 42-7 respectively. The ends of the sixth and seventh frame members 42-6 and 42-7 are overlapped above the middles of the fourth and fifth frame members 42-4 and 44-5 respectively. The middles of the sixth and seventh frame members 42-6 and 42-7 are overlapped below the ends of the second and third frame members 42-2 and 44-3 respectively.

Figure 14:
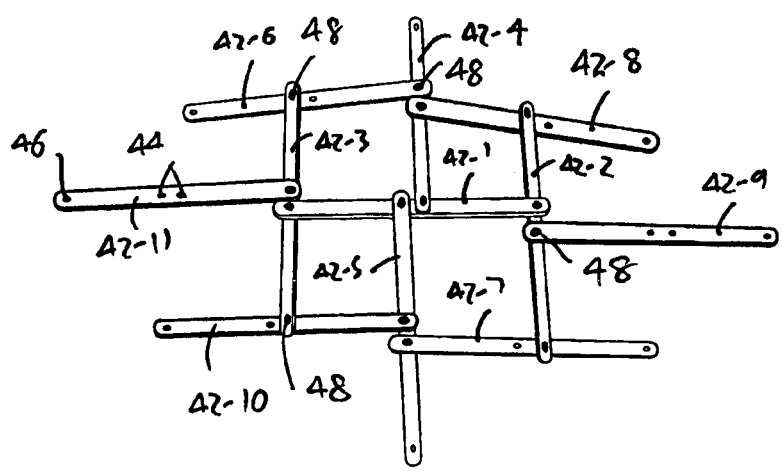

FIG. 14 shows the similar addition of the eight to eleventh frame members 42-8 to 42-11 respectively.

Figure 15:
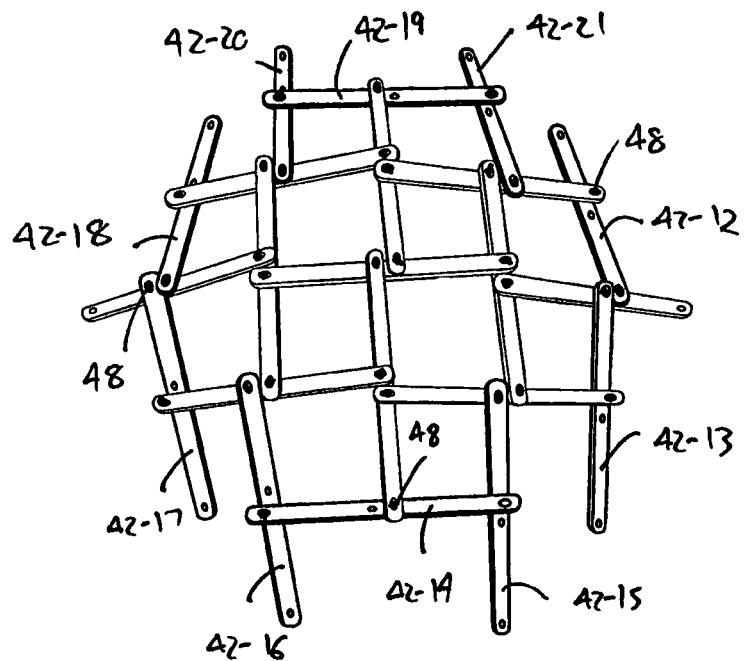

FIG. 15 shows the similar addition of eleven further frame members 42-12 to 42-21.

Figure 16:
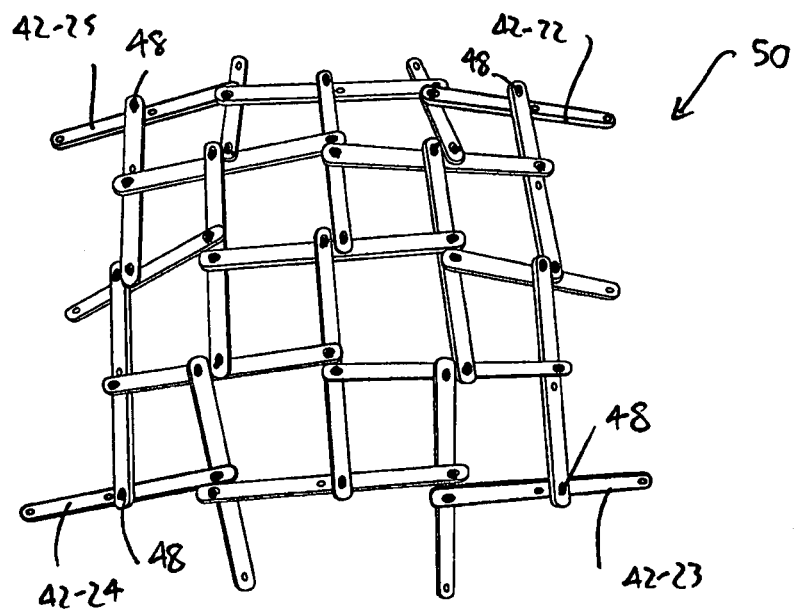

FIG. 16 shows the addition of four further frame members 42. Again, each additional frame member 42 is added from the ground level. The resultant frame 50 has a substantially square boundary shape.

Figure 17:
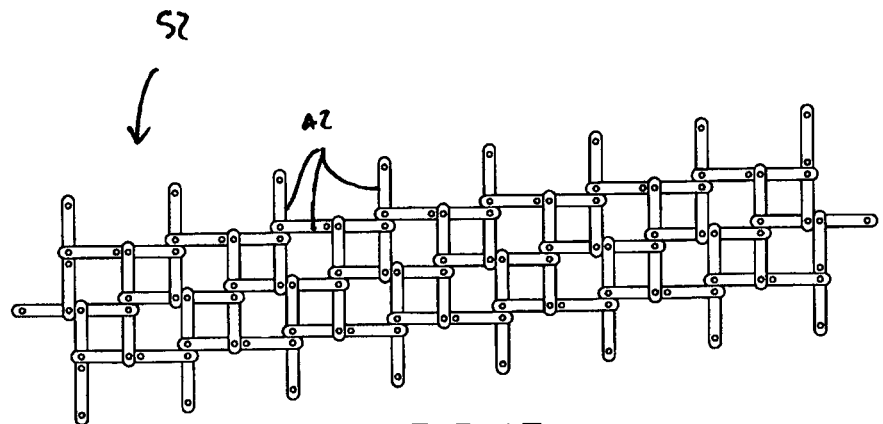
FIG. 17 is a top view of a third embodiment of a three dimensional upwardly convex frame.
Figure 18:
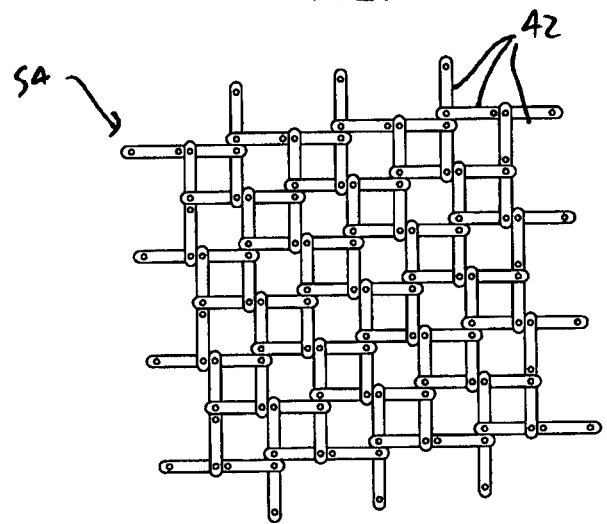
FIG. 18 is top view of a fourth embodiment of three dimensional upwardly convex frame.
Figure 19:
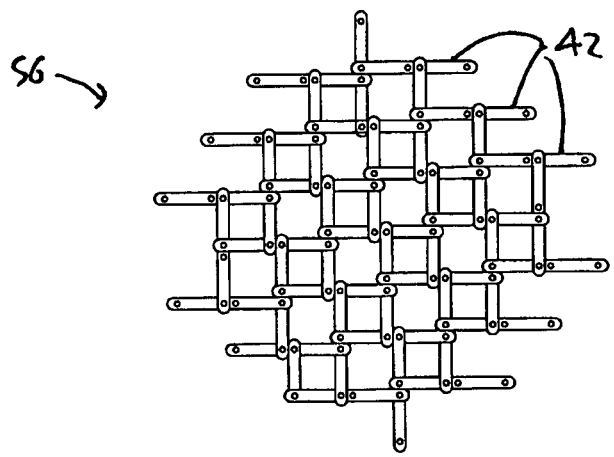
FIG. 19 is top view of a fifth embodiment of a three dimensional upwardly convex frame.

FIGS. 17, 18 and 19 show third, fourth and fifth embodiments of frames 52, 54 and 56 respectively, and demonstrate how the frame members 42 can be positioned in various orientations and configurations to produce frames of different shapes. As with earlier embodiments, the ends of frame members 42 are positioned above the middle of adjacent frame members 42.

The frame members 42 can be produced in various sizes and in various relatively rigid materials such as: steel, aluminium, concrete, fibreglass, carbon fibre or plastics.

Figure 20:
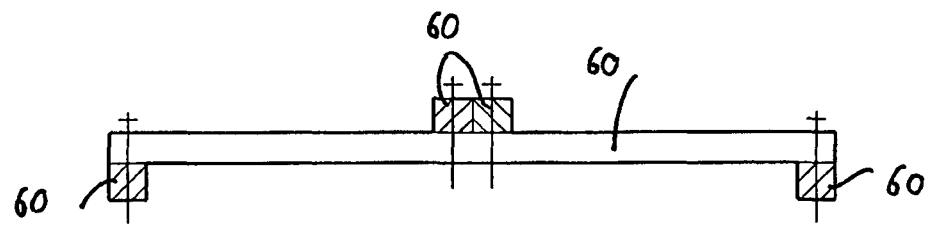
FIG. 20 is a cross sectional side view of a first example of a frame member.

FIG. 20 shows a second embodiment of frame members 60 formed as a square cross section beam, with a length to height ratio of 20:1.

Figure 21:
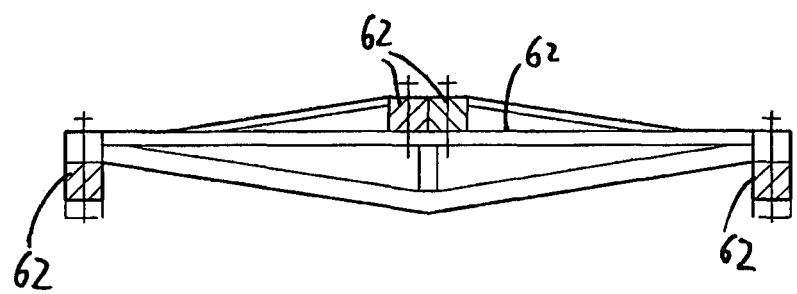
FIG. 21 is a cross sectional side view of a second example of a frame member.
Figure 22:
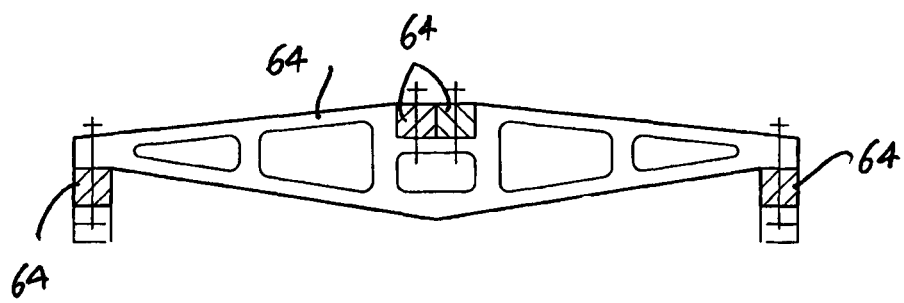
FIG. 22 is a cross sectional side view of a third example of a frame member.

FIG. 21 shows a third embodiment of frame members 62, also with a length to height ratio of 20:1, that are suitable for construction by metal fabrication.

Figure 23:
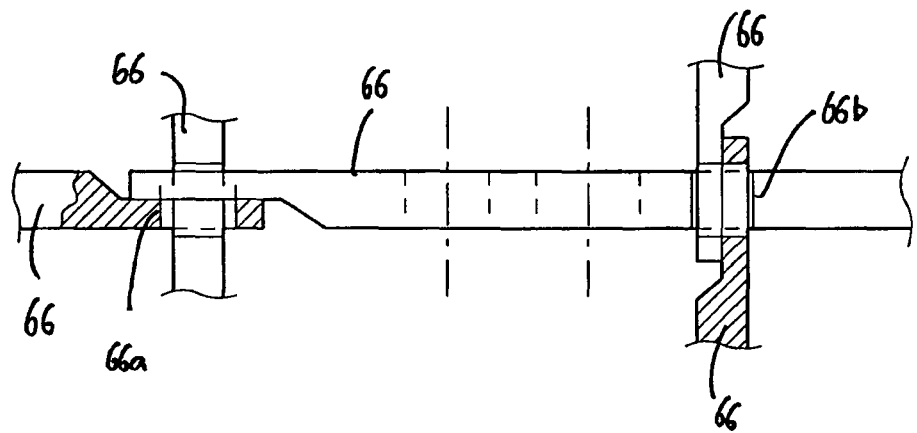
FIG. 23 is a top of a fourth example of a frame member.

FIG. 23 shows a fourth embodiment of frame members 64, also with a length to height ratio of 20:1, that are suitable for production by casting.

Figure 24:
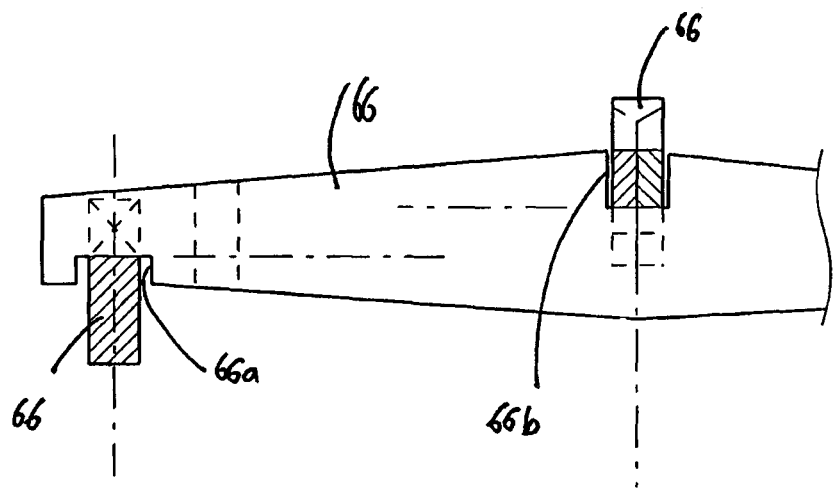
FIG. 24 is a cross sectional side view of the frame member shown in FIG. 23.

FIGS. 23 and 24 show fifth embodiment of frame members 66 which rely on notches or recesses 66a and 66b for connection with adjacent frame members 66 rather than pins or other fasteners. The notches 66a, 66b are made wider than the width of the overlapping frame members 66 in order to provide the previously mentioned flexibility required during initial construction.

Figure 25:
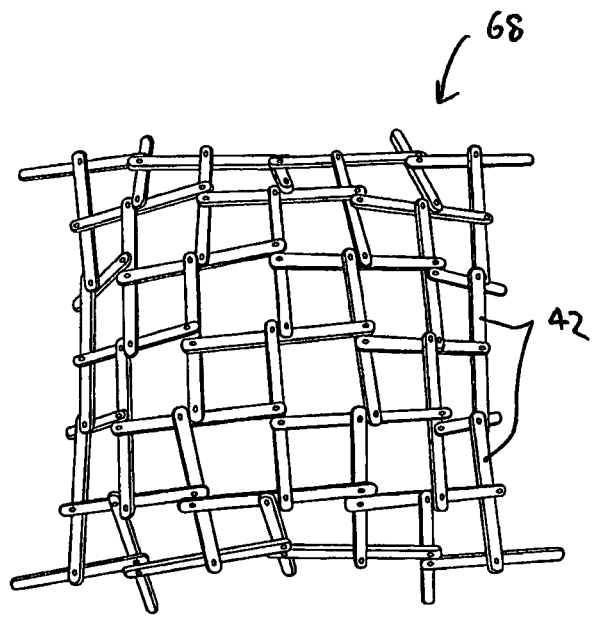
FIG. 25 is a top perspective view of a sixth embodiment of a three dimensional upwardly convex frame.
Figure 26:
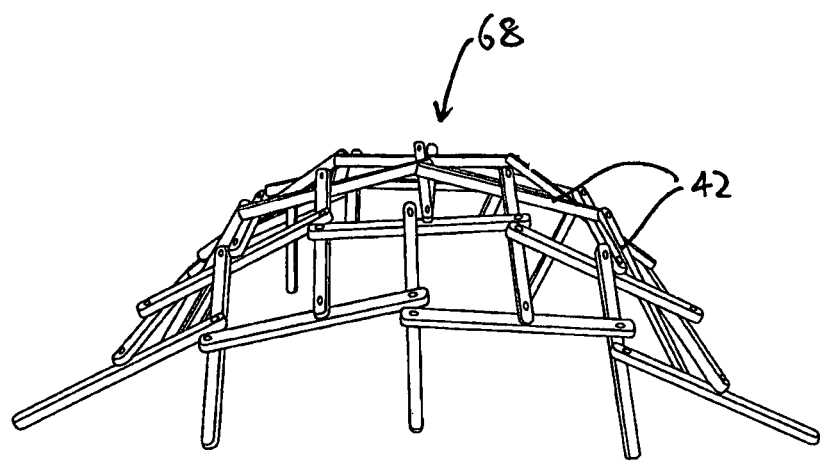
FIG. 26 is a side perspective view of the frame shown in FIG. 25.

FIG. 25 and FIG. 26 show a sixth embodiment of a frame 68, constructed in accordance with the previously described methods and demonstrating the resultant upwardly convex curvature.

Figure 27:
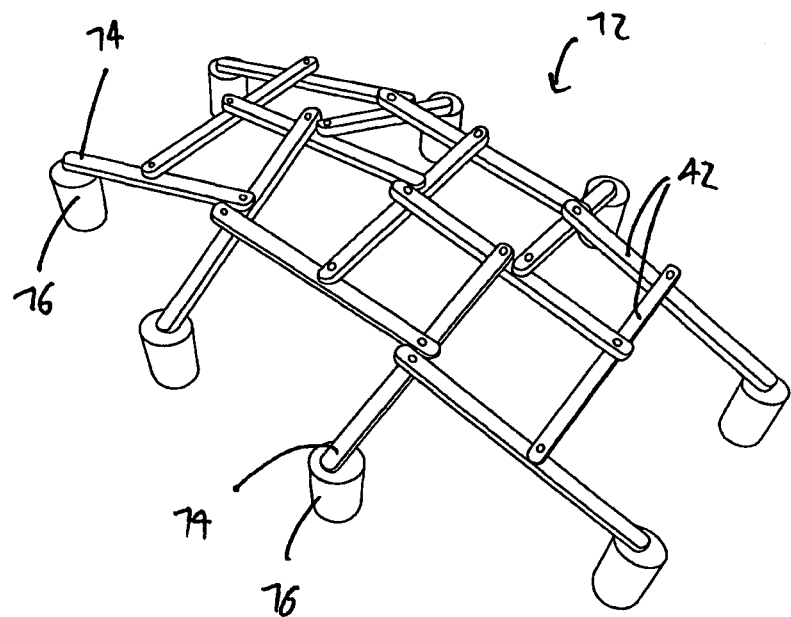
FIG. 27 is a top perspective view of a seventh embodiment of a three dimensional upwardly convex frame, elevated on columns.

FIG. 27 shows a seventh embodiment of an elevated frame 72, in which outwardly facing ends 74 of the outer most frame members 42 are each elevated by columns 76. The columns 76 are positioned at ground level and only require the local elevation of the outer most end 74 of each of the outer most frame members 42, in turn. This again obviates the need for cranes and the like equipment.

Figure 28:
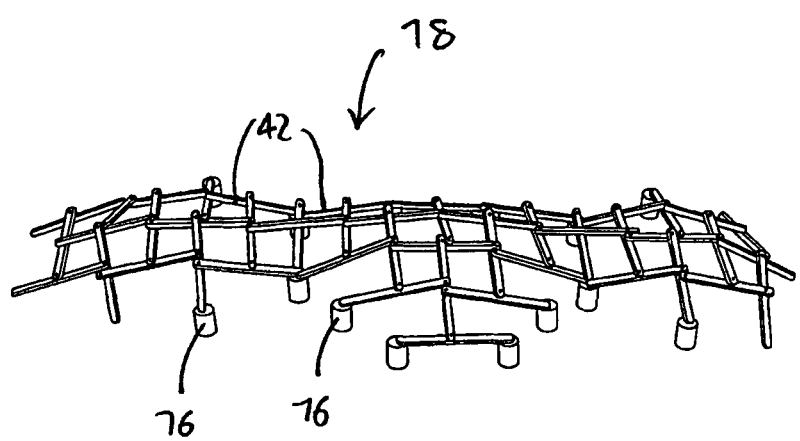
FIG. 28 is a side perspective view of an eighth embodiment of a three dimensional upwardly convex frame, partially elevated on columns.

FIG. 28 shows an eighth embodiment of a frame 78 in which some regions are elevated and some regions are supported on the ground.

Figure 29:
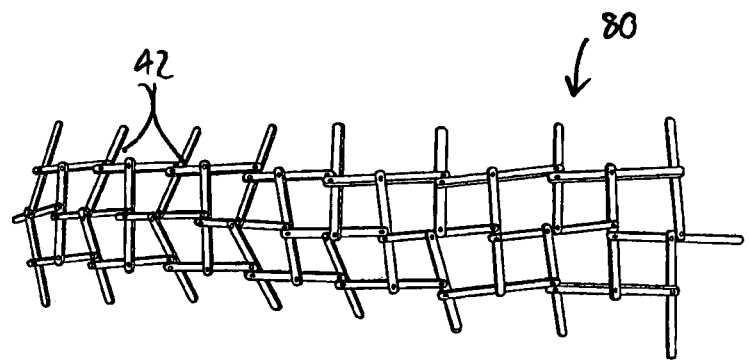
FIG. 29 is a top view of a ninth embodiment of a three dimensional upwardly convex frame.

FIG. 29 shows a ninth embodiment of a relatively elongate frame 80.

Figure 30:
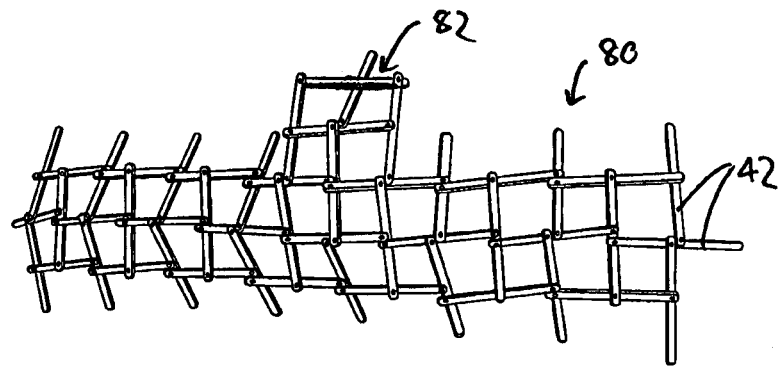
FIG. 30 is a top view of a tenth embodiment of a three dimensional upwardly convex frame.

FIG. 30 demonstrates how the frame of FIG. 29 can be expanded at one particular region 82.

Figure 31:
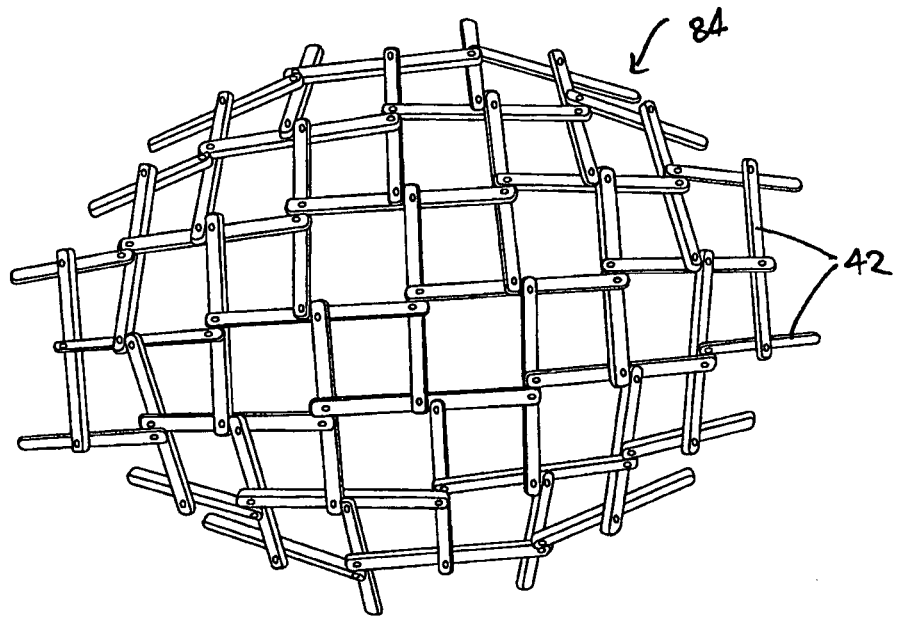
FIG. 31 is a top view of an eleventh embodiment of a three dimensional upwardly convex frame.

FIG. 31 shows an eleventh embodiment of a frame 84 having a substantially oval boundary shape.

Figure 32:
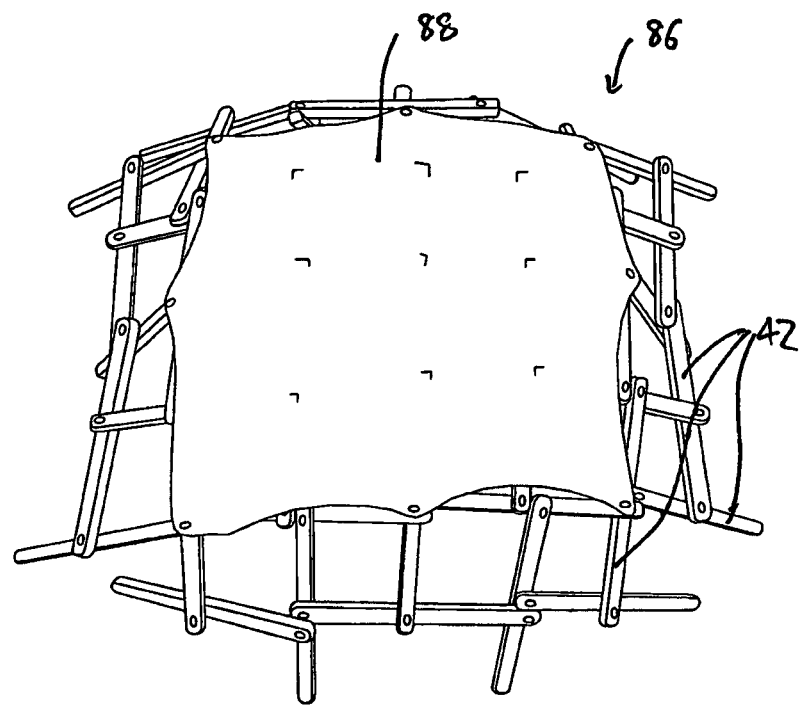
FIG. 32 is a top perspective view of a twelfth embodiment of a three dimensional upwardly convex frame, with a surface covering.

FIG. 32 shows a twelfth embodiment of a frame 86 to which has been applied a cover 88, for example to provide protection from the elements.

Figure 34:
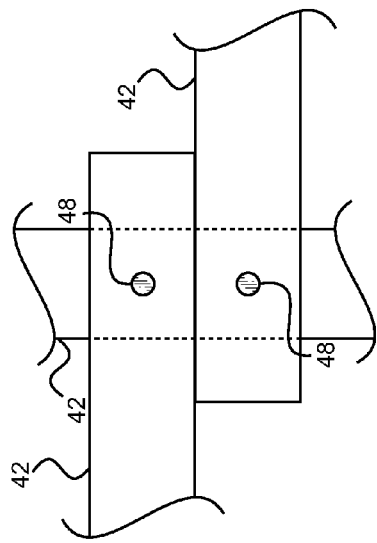
FIG. 34 is a top view of the frame members shown in FIG. 33.
Figure 33:
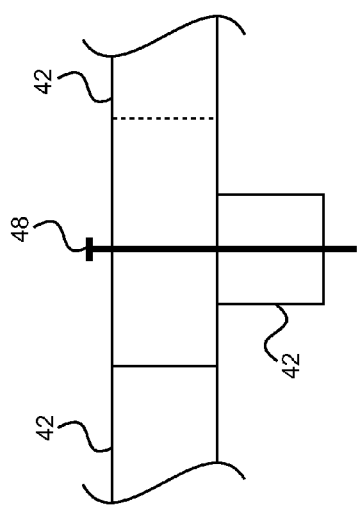
FIG. 33 is a partial detailed side view of overlapping frame members.

FIGS. 33 and 34 show enlarged views of an overlapping connection between frame members 42, similar to those previously described.

Figure 36:
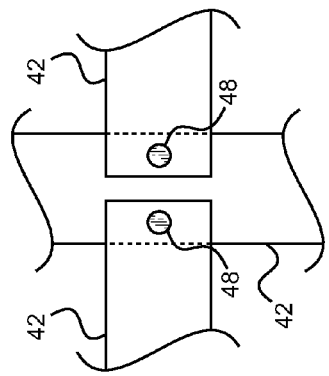
FIG. 36 is a top view of the frame members shown in FIG. 35.
Figure 35:
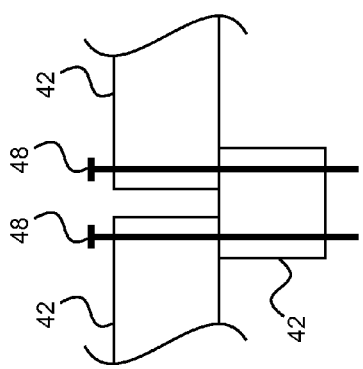
FIG. 35 is a partial detailed side view of loosely abutting frame members.

FIGS. 35 and 36 show enlarged views of a loosely abutting connection between frame members 42.

Figure 37:
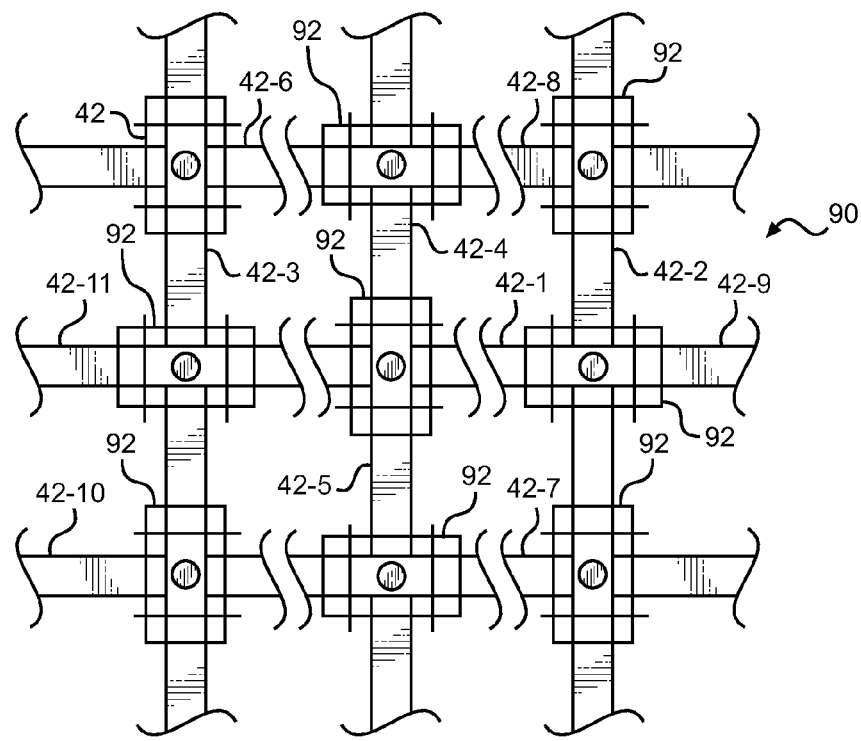
FIG. 37 is a top view of a thirteenth embodiment of a three dimensional upwardly convex frame.

FIG. 37 shows a thirteenth embodiment of a frame 90. In the frame embodiments previously described, the three dimensional upwardly convex shape is formed progressively as each frame member is added. However, the frame 90 is initially has all of its frame members 42 assembled into a flat shape, for example lying flat on the ground. The connected frame members 42 are then subsequently repositioned into a three-dimensional upwardly convex shape. This is achieved with the use of drive devices 92 which are positioned adjacent the middle and ends of the frame members 42, as will be described in more detail below.

Figure 38:
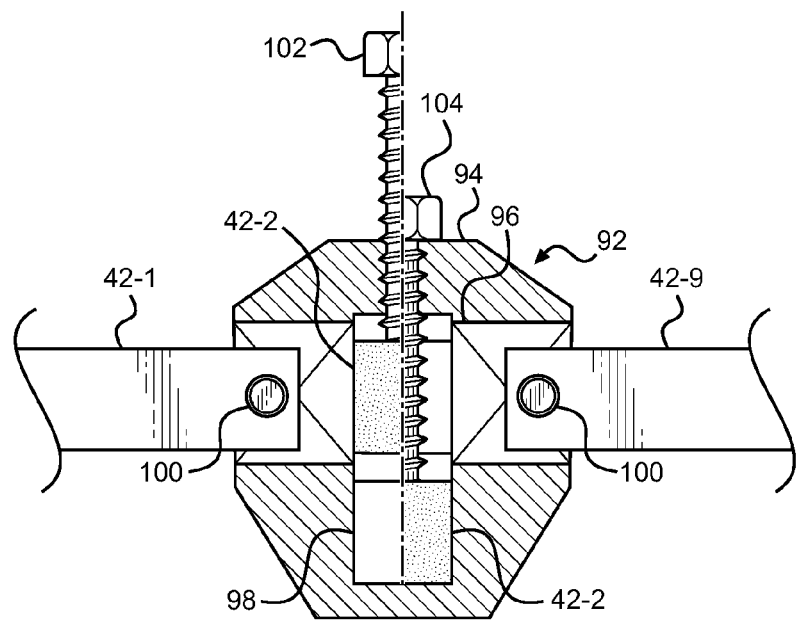
FIG. 38 is a cross sectional side view of a drive device associated with the frame shown in FIG. 37.

FIG. 38 shows the drives device 92 connected between the ends of the frame members 42-1 and 42-9 and adjacent the middle of the frame member 42-2. The drive device 92 includes a body 94 with passages 96 and 98 therethrough. The ends of the frame members 42-1 and 42-9 are positioned within the passage 96 and are pivotally connected to the body 94 by pins 100. The drive device 92 also includes a screw 102 that is threadibly engaged with an opening 104 in the top of the body 94.

The left hand side of FIG. 38 represents the relative positioning between the frame members 42-1, 42-9 and 42-2 during initial (ie. flat) construction of the frame 90.

The right hand side of FIG. 38 represents the subsequent repositioning between the frame members 42-1, 42-9 and 42-2 into the final (ie. curved) construction of the frame 90. More particularly, the right hand side of FIG. 38 shows the drive device 92 after the screw 102 has been driven downwardly into the body 94. The downward travel of the screw 102 drives the frame member 42-2 downwardly relative to the body 94, and thus the frame members 42-1 and 42-9. As a result, the ends of the frame members 42-1 and 42-9 are positioned above the middle of the frame member 42-2, in a similar manner to the frame embodiments previously described. When all of the drive devices 92 are manipulated consistent with the right hand side of FIG. 38, a three-dimensional upwardly convex shape is introduced into the frame 90, in a similar manner to the frame embodiments previously described.

Reversing the screw 102 back to the position shown on the left hand side of FIG. 38 returns the frame to a substantially flat configuration. The screw 102 can be rotated by a manual tool or by a powered tool.

Figure 40:
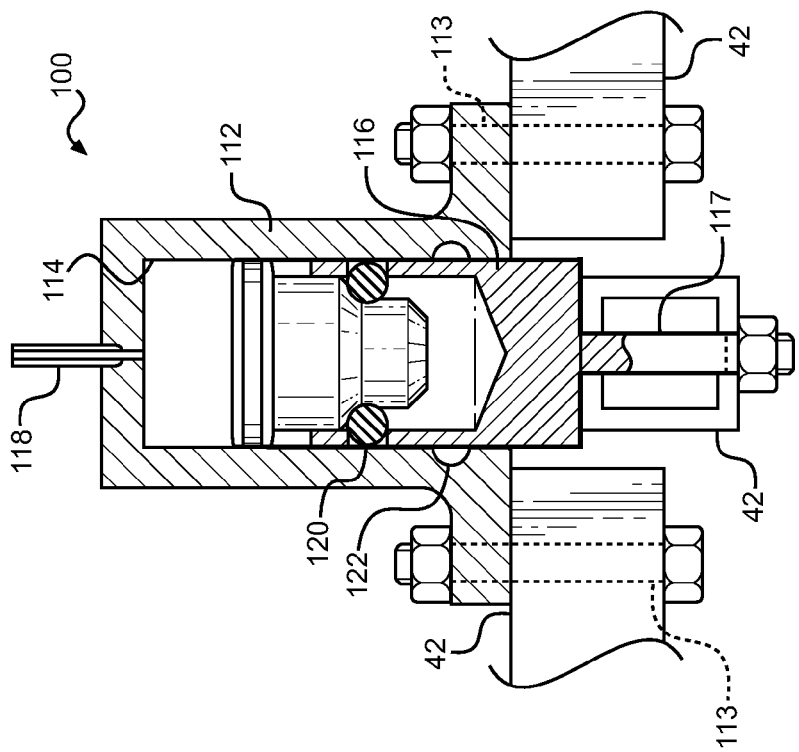
FIG. 40 is a cross sectional side view of the drive device shown in FIG. 38, in an intermediate position.
Figure 39:
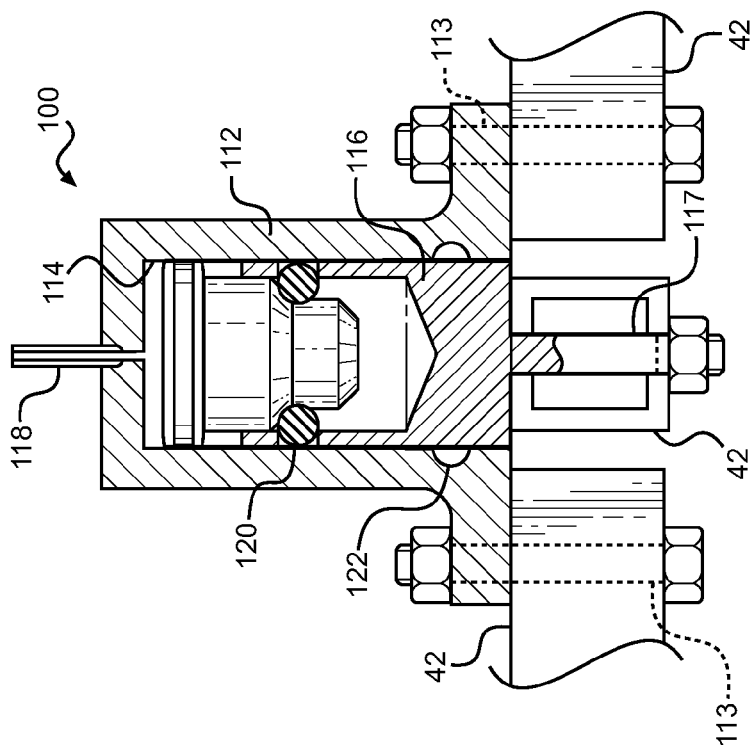
FIG. 39 is a cross sectional side view of an alternative drive device, in an initial (flat frame) position.
Figure 41:
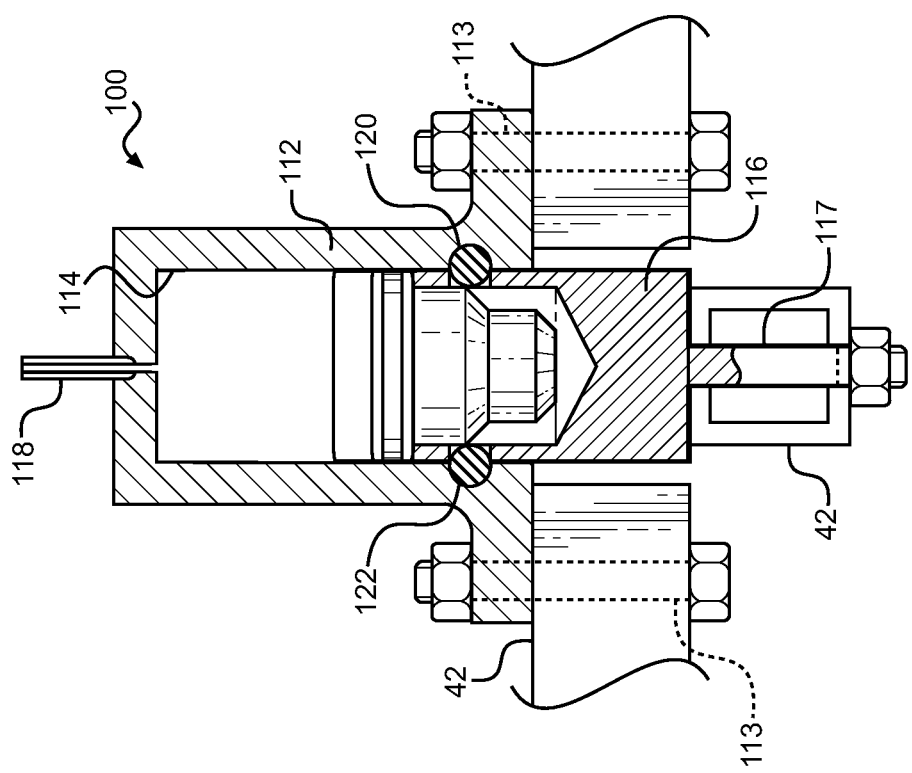
FIG. 41 is a cross sectional side view of the drive device shown in FIG. 38, in a subsequent (upwardly convex shaped frame) position.

FIGS. 39 to 41 show an alternative drive device 110. The drive device 110 includes a body 112 which is connected to the ends of frame members 42 by bolts 113. The body 112 includes a bore 114 within which is provided a piston 116. The piston is connected to the middle of an adjacent frame member 42 by bolt 117.

A line 118 is used to allow pressurised liquid or air to be provided to the bore 114 in order to drive the piston 116 relative to the body 112.

FIG. 39 shows the drive device 110 in an initial or flat frame position.

FIG. 40 shows the drive device during downward movement of the piston 116 relative to the body 112, responsive to pressurised liquid or air being provided to the bore 114.

FIG. 41 shows the drive device 110 in a subsequent or curved frame position with the ends of the frame members 42 being elevated above the middle of the adjacent frame member 42. As previously described, this produces a three-dimensional upwardly convex shape to the frame.

FIG. 49 also shows ball bearings 120 engaging within recesses 122 in order to latch or lock the position of the piston 116 relative to the body 112, such that the three-dimensional upwardly convex shape of the frame is maintained even when fluid or gas pressure is removed from the drive device 110.

The frame embodiments described in FIGS. 37 to 41 are particularly useful when the frame members are relatively heavy, as initial assembly can be conducted at ground level and without requiring any lifting or raising of individual frame members or of a partially or fully assembled frame. The three-dimensional upwardly convex shape is then produced later by manual or powered means. In addition, independent control or adjustment of each drive device allows variations in the final profile of the frame to be introduced. Further, appropriate power and control supply to individual drive devices can be used to produce dynamic changes in the shape of the completed frame.

Although the invention has been described with reference to specific examples, it will be appreciated by persons skilled in the art that the invention can be embodied in many other forms. For example, upper or lower short mast-type extensions can be applied to the frame members, which enable a covering or membrane to be placed at distance above or below the frame. This can provide safety (e.g. netting) or insulative (e.g. air gap) benefits. Further, the space between covering or membrane can be pressurised.

The invention claimed is:
1. A method of constructing a 3-dimensional, convex structure, the method including the steps of:
   providing a starting structure of substantially flat shape comprising a plurality of frame members, each of the plurality of frame members being substantially identical and longitudinally extending, each of the plurality of frame members being rigid, each of the plurality of frame members being overlapping or intersecting and connected at points of overlap or intersection by abutting connections configured to allow movement of each of the plurality of frame members relative to one another during construction, and a plurality of drive devices configured to displace one of the plurality of frame members from another of the plurality of frame members, the displacement occurring at the point of overlap or intersection;
   repositioning each of the plurality of frame members by actuating the drive devices to produce a dome structure or portion thereof, and wherein each of the plurality of frame members has at least two ends and a middle, and wherein two of the plurality of frame members are connected abutting at approximately the end of one of the plurality of frame members to a point offset from the middle of an adjacent one of the plurality of frame members.

2. The method of claim 1 wherein the step of repositioning each of the plurality of frame members elevates one of the plurality of frame members which is connected to another of the plurality of frame members.

3. The method of claim 2 wherein the ends of one of the plurality of frame members are elevated above the middle of an adjacent one of the plurality of frame members.

4. The method of claim 2 wherein the step of repositioning each of the plurality of the frame members results in the ends of one of the plurality of frame members being positioned above the middle of one of the plurality of frame members to which it is attached.

5. The method of claim 1 wherein all the drive devices are actuated.

6. The method of claim 1 wherein the drive devices are (i) independently controlled or adjusted, (ii) controlled or adjusted as a group, or (iii) controlled or adjusted as groups.

7. The method of claim 1 comprising the step of latching or locking the drive devices, and optionally unlatching or unlocking.

8. The method of claim 1 wherein the drive devices are positioned adjacent the middle and ends of each of the plurality of frame members.

9. The method of claim 1 wherein the drive devices are manually, hydraulically, pneumatically, chemically or electrically powered.

10. The method of claim 1 wherein the drive devices are (i) independently controllable or adjustable, (ii) controllable or adjustable as a group, or (iii) controllable or adjustable as groups.

11. The method of claim 1 wherein the drive devices are lockable or latchable, and optionally unlockable or unlatchable.

12. The method of claim 1 wherein the ends of each of the plurality of frame members are pivotally connected to the drive device.

13. The method of claim 1 wherein each of the plurality of frame members includes a pair of holes approximately adjacent the middle and a single hole approximately adjacent each end; wherein each of the plurality of frame members are connected to each other by fasteners passing through adjacent frame members of the plurality of frame members.

14. The method of claim 1 wherein each of the plurality of frame members includes a pair of male engaging formations approximately adjacent the middle and a corresponding single female engaging formation approximately adjacent each end; wherein each of the plurality of frame members includes a pair of female engaging formations approximately adjacent the middle and a corresponding single female engaging formation approximately adjacent each end.

15. The method of claim 14 wherein each of the plurality of frame members are connected to each other by one of the male engaging formations of the pair of male engaging formations being received within a corresponding female engaging formations of the corresponding single female engaging formation.

16. The method of claim 1 wherein each of the plurality of frame members includes a recess approximately adjacent the middle and a recess approximately adjacent each end, the recesses being wider than the width of the frame members.

17. A method of constructing a 3-dimensional, convex structure, the method including the steps of:
providing a starting structure of substantially flat shape comprising a plurality of frame members, each of the plurality of frame members being substantially identical and longitudinally extending, each of the plurality of frame members being rigid, each of the plurality of frame members being overlapping or intersecting and connected at points of overlap or intersection by abutting connections configured to allow movement of each of the plurality of frame members relative to one another during construction, and a plurality of drive devices configured to displace one of the plurality of frame members from another of the plurality of frame members, the displacement occurring at the point of overlap or intersection; repositioning each of the plurality of frame members by actuating the drive devices to produce a dome structure or portion thereof, and
wherein each of the plurality of frame members has a middle and two ends, and wherein two of the plurality of frame members connected by overlapping at approximately the end of one of the plurality of frame members to a point offset from the middle of an adjacent one of the plurality of frame members.

18. The method of claim 17 wherein the step of repositioning each of the plurality of frame members elevates one of the plurality of frame members which is connected to another of the plurality of frame members.

19. The method of claim 18 wherein the ends of one of the plurality of frame members are elevated above the middle of an adjacent one of the plurality of frame members.

20. The method of claim 17 wherein the step of repositioning each of the plurality of the frame members results in the ends of one of the plurality of frame members being positioned above the middle of one of the plurality of frame members to which it is attached.

21. The method of claim 17 wherein all the drive devices are actuated.

* * * * *